March 24, 1953 — C. E. KERR — 2,632,464
FLOAT VALVE
Filed Dec. 16, 1949 — 2 SHEETS—SHEET 1
FIG_1
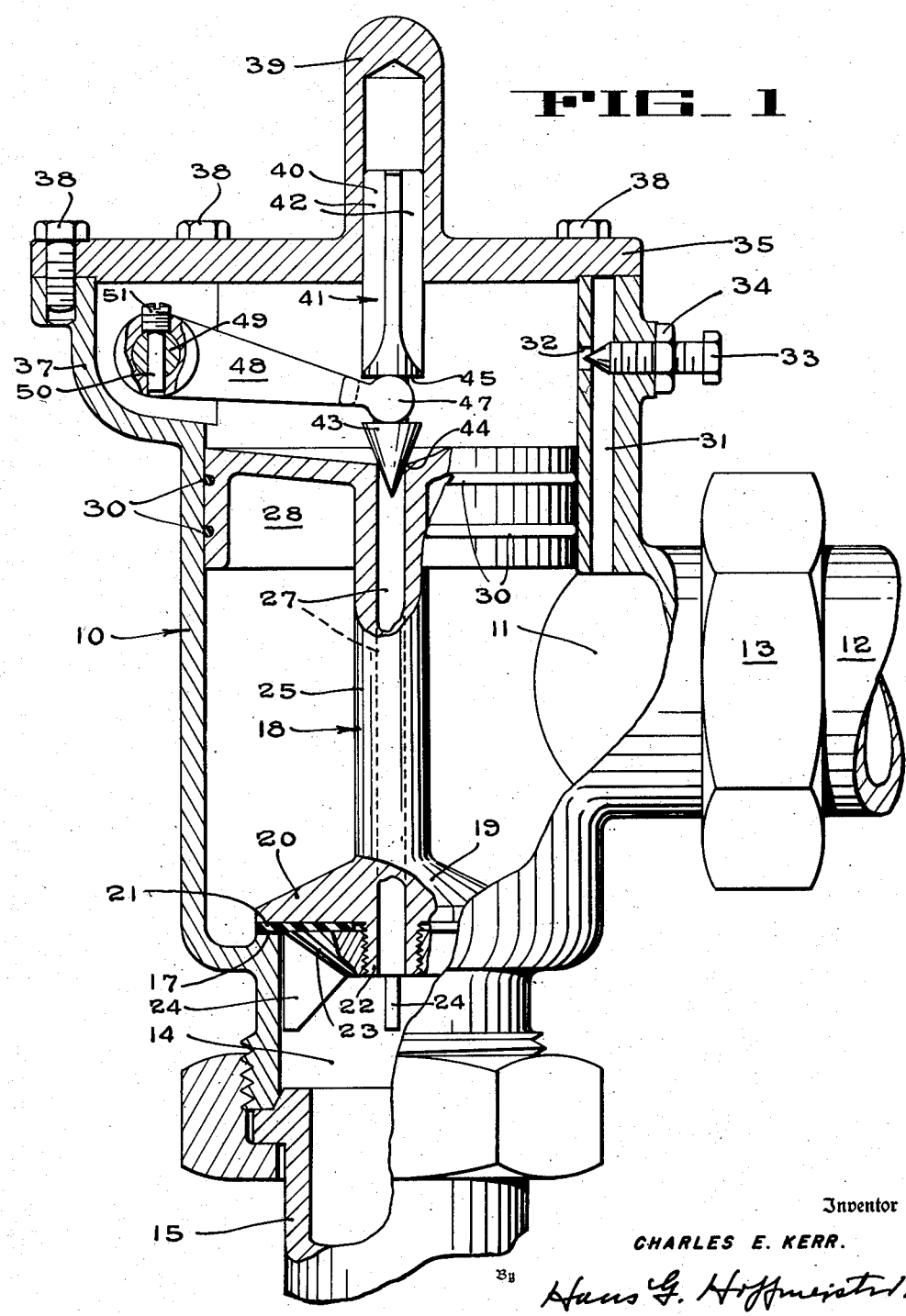
Inventor
CHARLES E. KERR.
By Hans G. Hoffmeister
Attorney March 24, 1953 — C. E. KERR — 2,632,464
FLOAT VALVE
Filed Dec. 16, 1949 — 2 SHEETS—SHEET 2
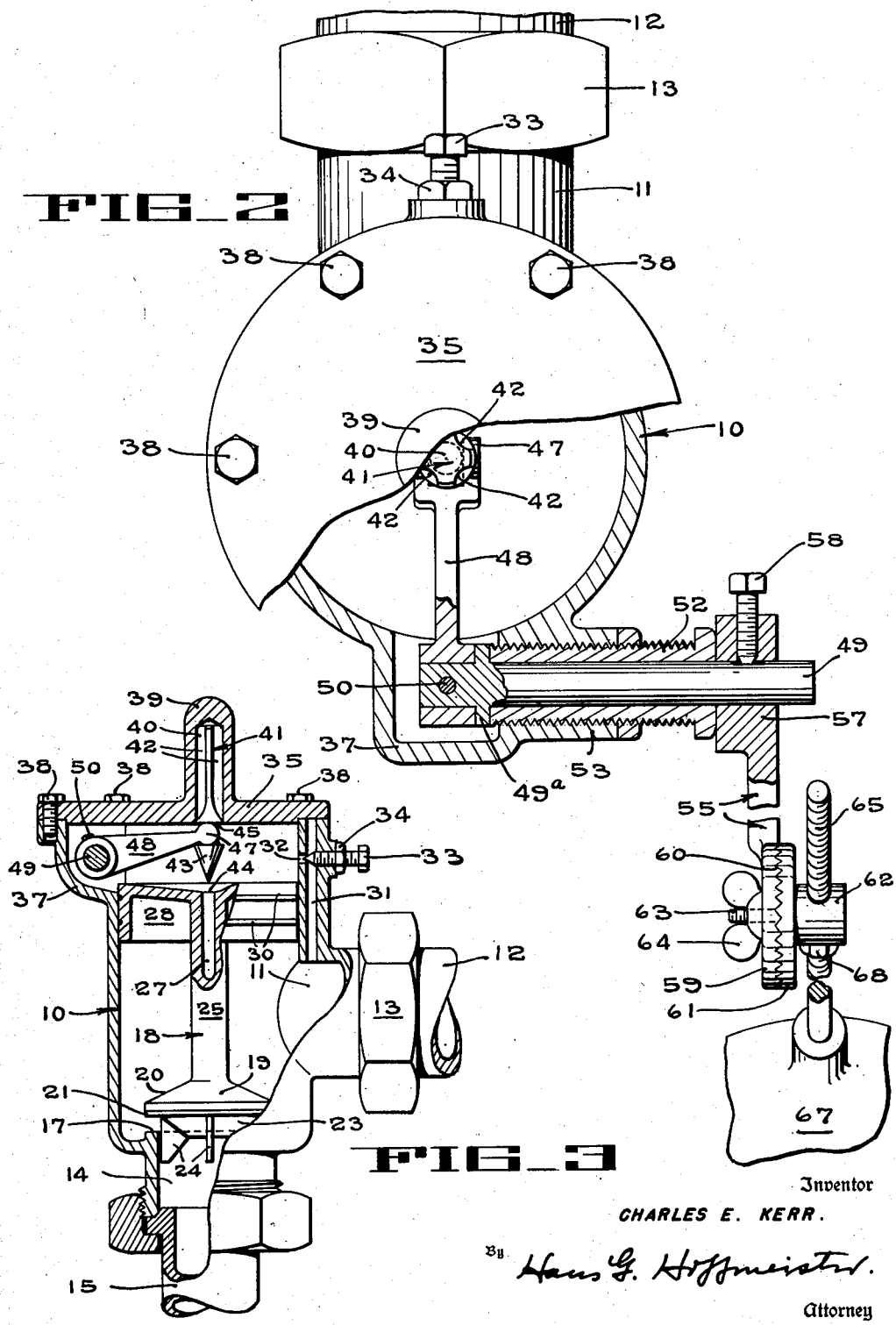
Inventor
CHARLES E. KERR.
By Hans G. Hoffmeister.
Attorney Patented Mar. 24, 1953

2,632,464

UNITED STATES PATENT OFFICE 2,632,464

FLOAT VALVE

Charles E. Kerr, Hoopeston, Ill., assignor to Food Machinery and Chemical Corporation, San Jose, Calif., a corporation of Delaware Application December 16, 1949, Serial No. 133,251

3 Claims. (Cl. 137—413)

The present invention relates to a float valve, and is directed more particularly to a float valve especially suited for use in controlling liquid levels in food processing machinery.

In many types of equipment used in food processing it is necessary to maintain a tank of syrup, brine or other liquid or fluent material such as heavy soups and crushed or strained vegetables, at an accurately controlled liquid level, so that the liquid head in the tank will be maintained substantially constant. It may be necessary frequently to change the liquid in the float valve controlled tank from one type to another, and at such times it is essential that all parts of the valve exposed to the material be cleaned thoroughly. Most types of valve used for this purpose are not easily cleaned, and frequently are difficult to adjust so that the necessarily accurate head will be maintained.

An object of the present invention is to provide a simple and effective float valve.

Another object is to make a float valve wherein the float mechanism is not required to operate against substantial liquid pressure or head.

Another object is to provide a float valve the parts of which may be easily cleaned.

Another object is to provide a float valve wherein float actuated mechanism is arranged to control liquid pressure on opposite sides of a main valve actuating piston.

Another object is to provide a piston actuated valve with a float controlled secondary valve whereby the rate of flow through the valve is controlled by changes in position of the float from a predetermined liquid supported position.

Another object is to provide a piston actuated valve with an adjustable by-pass valve and a float controlled secondary valve whereby actuation of the secondary valve may be regulated by adjustment of the by-pass valve.

These and other objects and advantages of the present invention will become apparent in the following description and the accompanying drawings, wherein:

Fig. 1 is a view in side elevation of a float valve embodying the present invention, parts of the valve being broken away along a vertical median plane, the valve being closed.

Fig. 2 is a plan view of the valve shown in Fig. 1, portions thereof being broken away and fragments of an adjustable float arm and float being shown.

Fig. 3 is a view in reduced scale similar to Fig. 1 showing the parts in float depressed, valve opened condition.

Referring to the drawings in detail, a valve housing or chamber 10 is of cylindrical cup shape and may be of cast metal such as brass. A lateral inlet passage 11 into the valve chamber is provided by a tubular extension at one side of the lower portion of the chamber. This inlet extension is threaded on its outer end and is adapted to have a supply pipe 12 connected thereto by a fitting 13 of a usual type. An outlet passage 14 also is provided by a tubular extension from the lower end of the valve chamber and is connected to an outlet pipe 15 by a fitting similar to that on the inlet extension.

The supply pipe 12 is adapted to be connected in a usual manner to a supply of fluent material, such as a liquid under suitable head or pressure to introduce the material into the chamber 10. The outlet pipe 15 adapted to discharge into a usual float tank, not shown, the level of liquid in which is to be controlled by the present valve.

A raised valve seat 17 is provided around the upper end of the outlet passage 14, and a main valve 18 is adapted to seat thereon. The main valve 18 has a head portion 19 with truncated conical upper surface 20 and a flat lower face beneath which an annular sealing gasket 21 is mounted. A threaded central boss 22 extends downwardly from the flat lower face of the valve head 19, and a nut 23, said nut having an outside diameter slightly less than the inside diameter of the outlet passage, is adapted to be screwed thereon to secure the gasket 21 in position.

Four integrally formed radially disposed guide vanes 24 extend downwardly from the lower side of the nut 23, and are arranged symmetrically around the central axis of the threaded opening through the nut. The outer edges of the guide vanes 24 are parallel to the valve axis when the parts are assembled as shown in Figs. 1 and 3, and have a freely slidable fit within the outlet passage 14 to guide the main valve 18 in its vertical operating movements.

The main valve 18 has an upright stem portion 25 with a central bore or passage 27 extending throughout the length of the valve.

A pressure sensitive piston 28 for actuating the main valve is formed integrally with the upper end of the valve stem 25, and has a working fit in the cylindrical valve chamber 10. Ring grooves 29 are provided about the periphery of the piston 28 and hydraulic sealing rings 30 of a usual type are mounted in these grooves to provide a fluid tight seal between the piston and the wall of the valve chamber.

An upwardly extending by-pass passage 31 is provided in the wall of the chamber 10 to communicate between the inlet passage 11 and the upper end of the valve chamber 10 above the piston 28. A port 32 opens from the by-pass passage into the valve chamber, the marginal edge surrounding the outer end of the port comprising a valve seat for a by-pass needle valve 33, having a threaded shank which is screwed into a threaded hole through the wall of the chamber axially outwardly from the port 32. A lock nut 34 secures the by-pass needle valve in adjusted position.

A cover plate 35 is mounted to fit over and hermetically seal the upper end of the valve chamber 10, and the upper end of the upright by-pass passage 31, and also extends over a laterally offset portion 37 of the valve chamber in which is mounted a portion of the float control mechanism to be described later herein. The cover plate is secured to the upper edge of the chamber wall by cap screws 38, and has an upwardly extending drilled boss 39 centrally thereof, in the bore of which the upper portion 40 of a float controlled needle valve 41 is mounted for free vertical guided movement.

The sides of the upper portion 40 of the float controlled needle valve are relieved as at 42 to permit the free passage of fluid therethrough, thereby to avoid fluid lock of the needle valve in its vertical movements in the bore of the boss 39.

The float controlled needle valve 41 has a usual conical needle valve nose 43 formed on its lower end which is adapted to have needle valve engagement with a seat 44 surrounding the upper end of the axial bore 27 through the main valve 18. An annular groove 45 is provided around the float controlled valve needle 41 between the upper guide portion 40 thereof and the lower conical valve nose portion, to receive the rounded bifurcated end portions 47 of a float controlled lever arm 48.

The float controlled lever arm 48 is secured in adjusted position on a rock shaft 49 by a pin 50 (Fig. 1) having a threaded head portion 51 which is screwed into a correspondingly threaded hole in the hub of the lever arm 48. The rock shaft 49 (Fig. 2) is journaled in an externally threaded bushing 52 which is screwed into a correspondingly threaded hole through a boss 53 which extends laterally from the offset portion 37 of the valve chamber. The rock shaft 49 has an integrally formed annular flange 49a thereon, which is adapted to fit closely against the inner end of the threaded bushing 52 to seal against the passage of liquid outwardly from the valve chamber between the bushing 52 and the rock shaft.

A float lever arm 55 is mounted on the outwardly projecting end of the rock shaft 49, and is secured in adjusted position thereon by a set screw 58, the point of which is adapted to seat on a flat portion formed on a side of the rock shaft to receive it. The outer end of the float arm 55 has a disk-like portion 59 with serrated face 60 adapted to contact a similarly serrated face on a second similar disk-like portion 61 having a float stem receiving boss 62 extending axially therefrom. The second disk-like member 61 has a threaded post 63 extending axially therefrom which is adapted to be inserted through a central opening in the first disk-like portion 59, and the disk portions are clamped together in angularly adjusted position by a thumb screw 64. The boss 62 has a threaded hole diametrically therethrough and the threaded stem 65 of a float ball 67 is adapted to be screwed therein and secured in adjusted position by a lock nut 68.

Operation

Fluent material such as a canning brine or syrup is supplied to the supply pipe 12 at pressure substantially greater than atmospheric. When the float ball 67 is unsupported by liquid and drops downwardly in the float tank under the force of gravity, it swings the rock shaft 49 and the connected lever arm 48 in a counter-clockwise direction toward the position illustrated in Fig. 3.

This pivotal movement of the lever arm 48 causes it to raise the float operated needle valve 41 upwardly off of its seat, thereby opening a relief passage from the upper portion of the float chamber 10 above the piston 28 to the outlet passage 14 through the axial bore 27 of the main valve 18. This action reduces the pressure in this upper portion of the valve chamber below that of the inlet passage 11.

The unbalance of pressure between the liquid in the inlet passage 11 and the upper portion of the valve chamber above the piston thus produced, causes the pressurized liquid to flow from the inlet passage 11 through the by-pass passage 31, the needle valve controlled by-pass port 32 and the main valve bore 27 at a rate which is controlled by the adjusted position of the by-pass needle valve 33 in the by-pass port 32 and the amount of opening of the float controlled needle valve 41. The by-pass passage should be restricted to an extent where the flow therethrough will be considerably less than that through the relief passage through the main valve so that the opening of the relief passage will cause a substantial drop in pressure in the upper portion of the valve chamber which will not be compensated for by the flow through the by-pass passage.

The lower side of the piston 28, when the main valve 18 is closed, is exposed to the pressure of the material in the inlet passage 11, while the upper side of the piston, when the float controlled needle valve is open, is exposed to the reduced pressure in the upper portion of the cylinder caused by the opening of the relief passage through the main valve to the outlet passage. This unbalance of pressure on opposite sides of the piston raises the piston and thereby opens the main valve 18, permitting the pressurized material from the inlet passage 11 to flow through the lower portion of the valve chamber, past the thus opened main valve, and into the float tank.

It will be noted that the main valve 18 has a tendency to seat itself, especially when in the closed position, due to the difference in pressures between the upper and lower sides of the valve head 19. As will be noted in Fig. 1 the pressure within the lower portion of the valve chamber is exerted on the upper side of the valve head 19, while only the head pressure, if any, of the liquid in the float tank at the depth where the lower side of the valve head is located is exerted on the lower side of the valve head. It is obvious that if the liquid level in the float tank is below the level of the main valve head 19 the pressure on the exposed under side of the valve head will be atmospheric when the valve is closed.

The pressures on the upper and lower sides of the valve head 19 of course changes substantially when this valve is open and the material is flowing past the valve and out the outlet passage 14. In spite of these variations in pressure on the valve head 19 however, the much larger effective pressure areas on the actuating piston 28 insure that this self closing tendency exerted by the valve head will not adversely affect the operation of the valve.

As long as the liquid level in the float tank is well below that at which the valve is adapted to be fully closed by the float as shown in Fig. 1, the float operated needle valve 41 will be elevated from its seat as shown in Fig. 3. As the float tank becomes filled however, and the float 67 rises, being buoyed up by the liquid in the float tank, the rock shaft 49 and lever arm 48 will be rotated from the open condition of Fig. 3 in a clockwise direction toward the closed condition shown in Fig. 1. As the float actuated valve needle 41 approaches its seat on the upper end of the main valve 18, the flow of material through the central bore of the valve will be restricted, thereby tending to raise the pressure on the upper side of the piston.

When the main valve 18 is open, the pressure in the lower portion of the valve chamber is reduced since it is in communication past the main valve head 19 and through the outlet passage 14 with the float chamber. The increase of pressure on the upper side of the piston therefore, due to the restriction of flow through the relief passage 27 through the main valve, imposed by the partial closing of the float controlled needle valve 41, will urge the piston 28 downward, moving the seat thereon for the float controlled valve needle 41 downwardly away from the needle until the relief bore through the main valve again is opened sufficiently to balance the pressures on the upper and lower sides of the piston 28 and thereby arrest further downward movement of the main valve. The flow of material into the upper portion of the valve chamber through the by-pass passage may be controlled by adjustment of the by-pass restricting needle valve 33, to vary the rate at which the flow of material through the by-pass into the upper portion of the valve chamber compensates for the changes in conditions mentioned previously herein.

Thus, as the float 67 gradually rises in the float tank, the flow of material outwardly through the main valve controlled outlet passage 14 will be gradually reduced until the float has been elevated to a position where both the float controlled needle valve 41 and the main valve 18 are closed. Since there is practically no resistance imposed by the needle valve 41 on the operation of the float mechanism, the present valve is extremely sensitive and maintains the level of the liquid in the float tank within close limits.

After use the entire valve mechanism can be easily flushed out by forcing a cleaning fluid such as hot water or steam into the inlet passage 11 and moving the float arm 55 up and down alternately to open and close the needle valve 41. This causes the cleaning fluid to operate the various parts of the valve in an obvious manner and to reach all parts of the valve for rinsing and cleaning them.

For a more thorough cleaning, or for repair or replacement of parts, the cover plate 35 may be removed, and the float controlled needle valve 41 may be tilted outwardly and removed from between the bifurcations 47 of the lever arm 48. The threaded securing pin 50 then may be removed to free the lever arm 48 for swinging upwardly about the rock shaft 49. This permits the main valve and piston member 18 to be withdrawn upwardly from the float chamber, which completes the disassembly of the device. The parts may be reassembled by reversing the above procedure.

While I have described a preferred embodiment of my present invention, it will be understood, however, that various changes and modifications may be made in the details thereof without departing from the spirit and scope of the appendant claims.

Having thus described the invention, what I claim as new and desire to protect by Letters Patent is as follows:

1. A float valve for food processing machines, adapted to control the flow of fluent material from a supply thereof under pressure through a pipe and into a float tank; comprising a main valve mounted to control the flow of material through said pipe, a compartment open at one end thereof and separated from said pipe and in communication therewith through a passage, removable cover means mounted to seal the open end of said compartment, means for controlling flow of material through said passage, a pressure sensitive member mounted in said compartment and operatively connected to the main valve and exposed on one side thereof to pressure within said pipe and on the other side thereof to pressure within said compartment, a relief passage communicating from the compartment to a lower pressure area exteriorly thereof, a relief valve mounted wholly within said compartment and adapted to control flow of material through said relief passage, a rocking element mounted in a sealed bearing in a laterally offset chamber at the open end of the compartment and extending exteriorly thereof, a lever arm releasably secured to the rocking element so as to be rotated thereby and adapted operatively to engage said relief valve, and float means mounted on an exterior portion of the rocking element and adapted to operate said lever arm and thereby said relief valve, said arm being pivotally movable clear of said compartment upon removal of said cover and the release of the arm from the rocking element so that the arm is rotatable on the rocking element, thereby to free the valves and pressure-sensitive member for removal from the compartment.

2. A float valve for food processing machines comprising a cylindrical chamber having one open end, an inlet and an endwise opening outlet, said inlet being adapted to be connected to a supply of fluent material under pressure, a laterally offset compartment formed on said chamber and opening thereto, a cover plate removably mounted to close the open end of said chamber, a main valve head movable axially of said chamber to control said outlet, a piston carried by said valve head to operate in said chamber, said main valve head and piston having a continuous relief passage therethrough, a relief valve mounted for guided movement lengthwise of said chamber into sealing engagement with said relief passage, a float controlled shaft pivotally mounted in a wall of said offset compartment and sealed thereto, and a valve actuating arm releasably secured in adjusted position to said shaft so as to be rotated thereby and releasably engaging said relief valve for operation of the relief valve upon a float controlled movement of said arm, said arm being pivotally movable upon removal of said cover plate and release of the arm from said float controlled shaft so that the arm is rotatable on said shaft, thereby to clear the cylindrical chamber and to free the piston and main valve head for lengthwise removal from the chamber.

3. A float valve for food processing machines comprising a cylindrical chamber having one open end, an inlet and an endwise opening outlet, said inlet being adapted to be connected to a supply of fluent material under pressure, an endwise opening, a laterally offset compartment formed on said chamber at the open end thereof and opening thereto, a cover plate removably mounted to close the open end of said chamber and of the offset compartment thereof, a main valve head movable axially of said chamber to control said outlet, a valve stem extending from said valve head lengthwise of said chamber, a piston mounted on said valve stem to operate in said chamber, said main valve head, stem and piston having a continuous relief passage therethrough, a by-pass passage communicating between the portions of the chamber on opposite sides of the piston, a relief valve mounted for guided movement lengthwise of said chamber into sealing engagement with said relief passage, a float controlled shaft pivotally mounted in a wall of said offset compartment and sealed thereto, and a valve actuating arm releasably secured to said shaft so as to be rotated thereby and releasably engaging said relief valve for operation of the relief valve upon a float controlled movement of said arm, said arm being pivotally movable upon removal of said cover plate and release of the arm from said float controlled shaft so that the arm is rotatable on said shaft, thereby to clear the cylindrical chamber and free the piston, stem and main valve head for endwise removal from the chamber.

CHARLES E. KERR.

REFERENCES CITED

The following references are of record in the file of this patent:

UNITED STATES PATENTS

| Number | Name | Date |
|---|---|---|
| 1,955,495 | Hack | Apr. 17, 1934 |

FOREIGN PATENTS

| Number | Country | Date |
|---|---|---|
| 8,179 | Great Britain | Apr. 25, 1895 |